US012388711B2

(12) United States Patent
Bosanac et al.

(10) Patent No.: US 12,388,711 B2
(45) Date of Patent: *Aug. 12, 2025

(54) POLICY MANAGEMENT ACROSS MULTIPLE CLOUD COMPUTING ENVIRONMENTS WITHIN A NETWORK

(71) Applicant: Netskope, Inc., Santa Clara, CA (US)

(72) Inventors: Jonathan Michael Bosanac, San Francisco, CA (US); Christopher Robert Geeringh, Berkeley, CA (US); Jason Eggleston, Newport Beach, CA (US); Lonhyn Jasinskyj, Palo Alto, CA (US); John Sengenberger, Meridian, ID (US)

(73) Assignee: Netskope, Inc., Santa Clara, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 17/701,467

(22) Filed: Mar. 22, 2022

(65) Prior Publication Data

US 2022/0217050 A1    Jul. 7, 2022

Related U.S. Application Data

(63) Continuation of application No. 17/101,892, filed on Nov. 23, 2020, now Pat. No. 11,316,741.

(51) Int. Cl.
*H04L 41/0866* (2022.01)
*H04L 41/0893* (2022.01)
*H04L 41/0894* (2022.01)

(52) U.S. Cl.
CPC ...... *H04L 41/0866* (2013.01); *H04L 41/0893* (2013.01); *H04L 41/0894* (2022.05)

(58) Field of Classification Search
CPC ............. H04L 41/0893; H04L 41/0866; H04L 41/0894; H04L 63/20; H04L 41/0853;
(Continued)

(56) References Cited

U.S. PATENT DOCUMENTS 5,440,723 A    8/1995  Arnold et al.
6,353,866 B1 *  3/2002  Fensore ................ G06F 13/426
                                                  710/104
(Continued)

FOREIGN PATENT DOCUMENTS

EP    1063833 A2    12/2000

OTHER PUBLICATIONS

Yifei Yuan, Rajeev Alur, and Boon Thau Loo. 2014. NetEgg: Programming Network Policies by Examples. In Proceedings of the 13th ACM Workshop on Hot Topics in Networks (HotNets-XIII). Association for Computing Machinery, New York, NY, USA, 1-7. (Year: 2014).*

(Continued)

*Primary Examiner* — Taylor A Elfervig
(74) *Attorney, Agent, or Firm* — MUGHAL GAUDRY & FRANKLIN PC

(57) ABSTRACT

A system for providing policy-controlled communication between a plurality of different cloud computing environments includes a user interface that receives configuration settings to be applied to a plurality of first instances and a plurality of second instances. A plurality of collectors of the system that retrieve information from a first cloud computing environment and a second cloud computing environment, and a controller determines policies for the plurality of first instances and the plurality of second instances. A configurator of the system applies the policies to the plurality of first instances and the plurality of second instances, a first tester that inspects operations of the plurality of first instances and detects violations of the policies, and an enforcer responds to the detected violations. The controller instructs the configurator to apply the first policy to the first instance again, shut down the first instance or cut off communications with the first instance.

20 Claims, 6 Drawing Sheets

(58) Field of Classification Search
CPC ..... H04L 43/50; H04L 43/0817; H04L 41/28; H04L 41/0681; H04L 41/0873
USPC ...................................................... 709/220
See application file for complete search history.

(56) References Cited

U.S. PATENT DOCUMENTS

| | | |
|---|---|---|
| 6,513,122 B1 | 1/2003 | Magdych et al. |
| 6,622,248 B1 | 9/2003 | Hirai |
| 7,000,006 B1 | 2/2006 | Chen |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,112,379 B2 | 2/2012 | Voskuil et al. |
| 8,296,178 B2 | 10/2012 | Hudis et al. |
| 8,719,804 B2 | 5/2014 | Jain |
| 8,793,151 B2 | 7/2014 | DelZoppo et al. |
| 8,839,417 B1 | 9/2014 | Jordan |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,282,118 B2 | 3/2016 | Elzur |
| 9,729,465 B2 | 8/2017 | Labocki et al. |
| 9,811,662 B2 | 11/2017 | Sharpe et al. |
| 10,051,042 B2 | 8/2018 | Diwakar et al. |
| 10,084,825 B1 | 9/2018 | Xu |
| 10,237,282 B2 | 3/2019 | Nelson et al. |
| 10,334,442 B2 | 6/2019 | Vaughn et al. |
| 10,382,468 B2 | 8/2019 | Dods |
| 10,437,625 B2 | 10/2019 | Kaufman et al. |
| 10,484,334 B1 | 11/2019 | Lee et al. |
| 10,498,693 B1* | 12/2019 | Strauss .................. H04L 61/50 |
| 10,826,941 B2 | 11/2020 | Jain et al. |
| 11,032,301 B2 | 6/2021 | Mandrychenko et al. |
| 11,036,856 B2 | 6/2021 | Graun et al. |
| 11,281,775 B2 | 3/2022 | Burdett et al. |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0172292 A1 | 9/2003 | Judge |
| 2003/0204632 A1 | 10/2003 | Willebeek-LeMair et al. |
| 2004/0015719 A1 | 1/2004 | Lee et al. |
| 2005/0010593 A1 | 1/2005 | Fellenstein et al. |
| 2005/0044197 A1* | 2/2005 | Lai .......................... H04L 67/02 709/223 |
| 2005/0271246 A1 | 12/2005 | Sharma et al. |
| 2006/0156401 A1 | 7/2006 | Newstadt et al. |
| 2007/0204018 A1 | 8/2007 | Chandra et al. |
| 2007/0237147 A1 | 10/2007 | Quinn et al. |
| 2008/0069480 A1 | 3/2008 | Aarabi et al. |
| 2008/0134332 A1 | 6/2008 | Keohane et al. |
| 2009/0144818 A1 | 6/2009 | Kumar et al. |
| 2009/0249470 A1 | 10/2009 | Litvin et al. |
| 2009/0300351 A1 | 12/2009 | Lei et al. |
| 2010/0017436 A1 | 1/2010 | Wolge |
| 2010/0318642 A1 | 12/2010 | Dozier |
| 2011/0119481 A1 | 5/2011 | Auradkar et al. |
| 2011/0145594 A1 | 6/2011 | Jho et al. |
| 2012/0185913 A1* | 7/2012 | Martinez ................. H04L 63/20 726/1 |
| 2012/0278896 A1 | 11/2012 | Fang et al. |
| 2013/0159694 A1 | 6/2013 | Chiueh et al. |
| 2013/0298190 A1 | 11/2013 | Sikka et al. |
| 2013/0347085 A1 | 12/2013 | Hawthorn et al. |
| 2014/0013112 A1 | 1/2014 | Cidon et al. |
| 2014/0068030 A1 | 3/2014 | Chambers et al. |
| 2014/0068705 A1 | 3/2014 | Chambers et al. |
| 2014/0259093 A1 | 9/2014 | Narayanaswamy et al. |
| 2014/0282843 A1 | 9/2014 | Buruganahalli et al. |
| 2014/0359282 A1 | 12/2014 | Shikfa et al. |
| 2014/0366079 A1 | 12/2014 | Pasdar |
| 2015/0100357 A1 | 4/2015 | Seese et al. |
| 2016/0218926 A1 | 7/2016 | Johnson et al. |
| 2016/0323318 A1 | 11/2016 | Terrill et al. |
| 2016/0350145 A1 | 12/2016 | Botzer et al. |
| 2017/0064005 A1 | 3/2017 | Lee |
| 2017/0093917 A1 | 3/2017 | Chandra et al. |
| 2017/0250877 A1 | 8/2017 | Seyvet et al. |
| 2017/0250951 A1 | 8/2017 | Wang et al. |
| 2018/0069948 A1 | 3/2018 | Blank et al. |
| 2018/0115463 A1 | 4/2018 | Sinha et al. |
| 2018/0173604 A1 | 6/2018 | Bhat et al. |
| 2018/0234459 A1* | 8/2018 | Kung .................. H04L 63/0263 |
| 2018/0241751 A1* | 8/2018 | Kruse .................. H04L 63/102 |
| 2020/0004589 A1 | 1/2020 | Geiger et al. |
| 2020/0028894 A1* | 1/2020 | Memon ................. G06F 3/0605 |
| 2020/0050686 A1 | 2/2020 | Kamalapuram et al. |
| 2020/0295999 A1 | 9/2020 | Anandam et al. |
| 2020/0364078 A1 | 11/2020 | Potter |

OTHER PUBLICATIONS

Tang, Y., Cheng, G., Xu, Z. et al. Automatic belief network modeling via policy inference for SDN fault localization. J Internet Serv Appl 7, 1 (2016) (Year: 2016).*

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al. , Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F,and also has defined functions.

NIIT, Special Edition Using Storage Area Networks, Que, 2002, 6 pgs.

(56) References Cited

OTHER PUBLICATIONS

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.
Fortinet, FortiGate—3600 User Manual (vol. 1 , Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet,FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.
Lee et al., "A Data Mining Framework for Building Intrusion Detection Models," Columbia University, n.d. 13 pgs, 1999.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management for Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

* cited by examiner

POLICY MANAGEMENT ACROSS MULTIPLE CLOUD COMPUTING ENVIRONMENTS WITHIN A NETWORK

CROSS-REFERENCE TO RELATED APPLICATIONS

This application is a continuation of U.S. patent application Ser. No. 17/101,892, entitled "MULTI-ENVIRONMENT NETWORKING MANAGEMENT SYSTEM," filed on Nov. 23, 2020, the contents of which are incorporated by reference in their entirety for all purposes.

BACKGROUND

This disclosure relates in general to systems and methods for managing policies across multiple cloud computing environments within a network.

Different cloud computing environments use different languages, data sources, commands, and protocols. For example, each cloud computing provider may use a different method to allocate subnets and IP addresses to instances within the respective cloud computing environment. This may cause instances within a network having multiple cloud computing environments to have overlapping subnets and IP addresses. Further, each cloud computing provider may require different instructions for applying policies to instances within the respective cloud computing environment.

SUMMARY

Exemplary embodiments of the invention provide systems and methods for determining, enforcing, and managing policies across different cloud computing environments within a network. According to an aspect of the invention, a system includes a user interface that receives configuration settings to be applied to a plurality of first instances and a plurality of second instances. A plurality of collectors of the system that retrieve information from a first cloud computing environment and a second cloud computing environment, and a controller determines policies for the plurality of first instances and the plurality of second instances. A configurator of the system applies the policies to the plurality of first instances and the plurality of second instances, a first tester that inspects operations of the plurality of first instances and detects violations of the policies, and an enforcer responds to the detected violations by receiving a notification from the first tester that a first instance from the plurality of first instances violated a first policy. The controller instructs the configurator to apply the first policy to the first instance again, shut down the first instance or cut off communications with the first instance.

According to another aspect of the invention, a method may include receiving configuration settings to be applied to a plurality of first instances within a first cloud computing environment and a plurality of second instances within a second cloud computing environment. In one step, information from the first cloud computing environment and the second cloud computing environment is retrieved. The information comprises a plurality of functionalities of the first cloud computing environment and the second cloud computing environment. The method further includes determining policies for the plurality of first instances within the first cloud computing environment and the plurality of second instances within the second cloud computing environment as functions of the configuration settings and the information. The policies are applied to the plurality of first instances within the first cloud computing environment and the plurality of second instances within the second cloud computing environment. Operations of the plurality of first instances within the first cloud computing environment and the plurality of second instances within the second cloud computing environment are inspected and violations of the policies by the plurality of first instances within the first cloud computing environment and the plurality of second instances within the second cloud computing environment are detected. In addition, the method also includes responding to the detected violations by receiving a notification that a first instance from the plurality of first instances violated a first policy. A controller instructs a configurator to apply the first policy to the first instance again, shut down the first instance or cut off communications with the first instance.

According to another aspect of the invention, a system may include a user interface that receives configuration settings to be applied to a plurality of first instances within a first cloud computing environment and a plurality of second instances within a second cloud computing environment. The system may also include a plurality of collectors that retrieve information from the first cloud computing environment and the second cloud computing environment. The information comprises a plurality of functionalities of the first cloud computing environment and the second cloud computing environment. In addition, the system may include a controller that determines policies for the plurality of first instances within the first cloud computing environment and the plurality of second instances within the second cloud computing environment as functions of the configuration settings and the information. Further, the system may include a configurator that applies the policies to the plurality of first instances within the first cloud computing environment and the plurality of second instances within the second cloud computing environment, a first tester that inspects operations of the plurality of first instances within the first cloud computing environment and detects violations of the policies by the plurality of first instances within the first cloud computing environment, and an enforcer that responds to the detected violations by receiving a notification from the first tester that a first instance from the plurality of first instances violated a first policy. The controller instructs the configurator to apply the first policy to the first instance again, shut down the first instance or cut off communications with the first instance.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
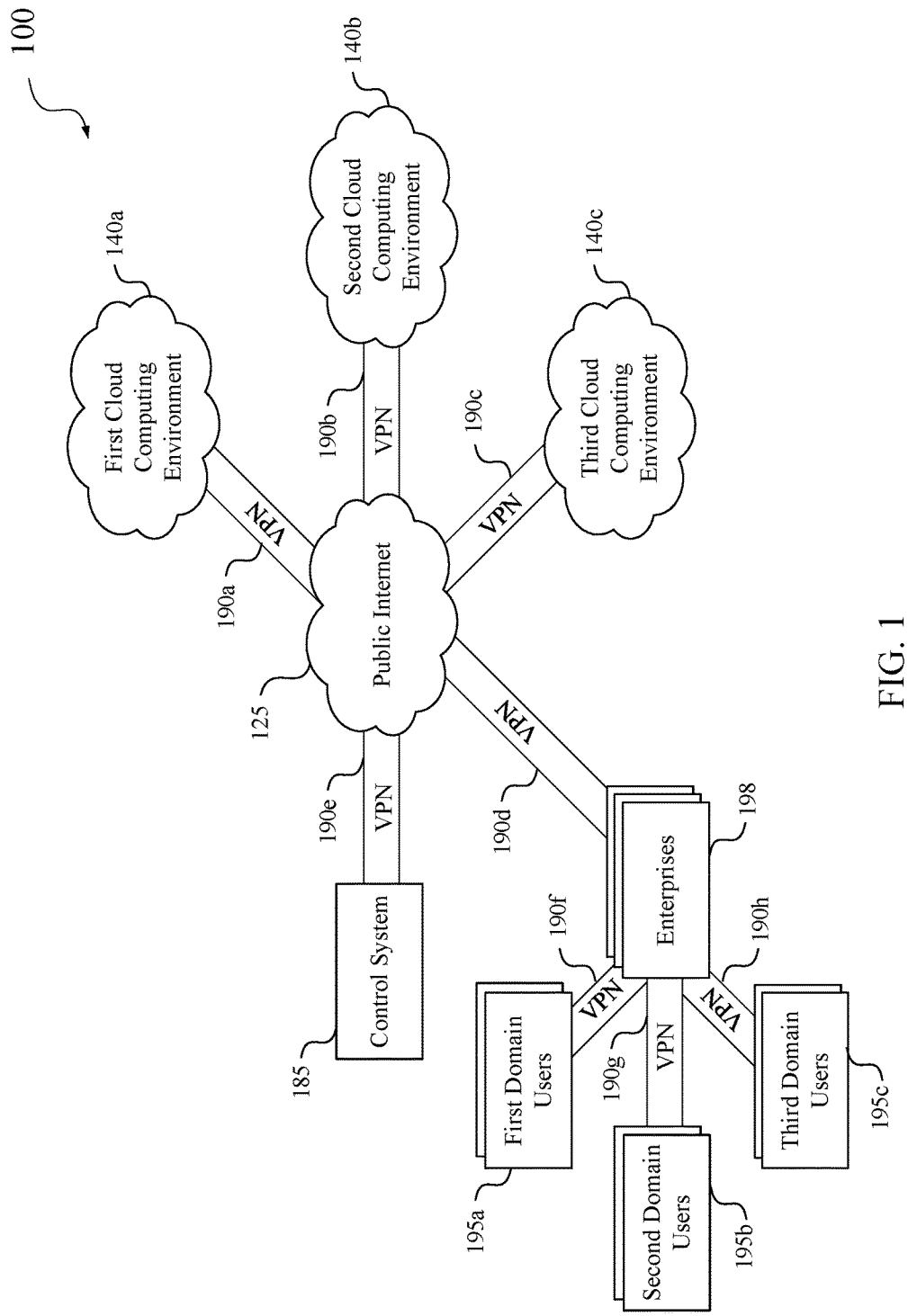
FIG. 1 depicts a block diagram of an embodiment of a network.

Referring first to FIG. 1, a block diagram of an embodiment of a network 100 is shown. The network 100 may include a first cloud computing environment 140a, a second cloud computing environment 140b, and a third cloud computing environment 140c that communicate via a public Internet 125. The first cloud computing environment 140a, the second cloud computing environment 140b, and the third cloud computing environment 140c may be public clouds. Some examples of the first cloud computing environment 140a, the second cloud computing environment 140b, and the third cloud computing environment 140c include Amazon Web Services (AWS)®, Google Cloud Platform (GCP)®, and Microsoft Azure®. Some or all of the first cloud computing environment 140a, the second cloud computing environment 140b, and the third cloud computing environment 140c may be different from each other. For example, the first cloud computing environment 140a may run Amazon Web Services (AWS)®, the second cloud computing environment 140b may run Google Cloud Platform (GCP)®, and the third cloud computing environment 140c may run Microsoft Azure®. Although three cloud computing environments are shown, any suitable number of cloud computing environments may be provided.

Each of the cloud computing environments may communicate with the Internet via a secure connection. For example, the first cloud computing environment 140a may communicate with the public Internet 125 via a virtual private network (VPN) 190a, the second cloud computing environment 140b may communicate with the public Internet 125 via a VPN 190b, and the third cloud computing environment 140c may communicate with the public Internet 125 via a VPN 190c.

A plurality of enterprises 198 may also communicate with the public Internet 125 via a VPN 190d. Some examples of the enterprises 198 may include corporations, educational facilities, governmental entities, and private consumers. In addition, the plurality of enterprises 198 may communicate with a plurality of first domain users 195a via a VPN 190f, a plurality of second domain users 195b via a VPN 190g, and a plurality of third domain users 195c via a VPN 190h. Some examples of the first domain users 195a, the second domain users 195b, and the third domain users 195c may include individual users that are authorized to use computing resources of the enterprises 198.

Further, a control system 185 may communicate with the public Internet 125 via a VPN 190e. As discussed in further detail below, the control system 185 may configure, test, and enforce policies across the first cloud computing environment 140a, the second cloud computing environment 140b, and the third cloud computing environment 140c. For example, the control system 185 may ensure that the policies are consistent across the first cloud computing environment 140a, the second cloud computing environment 140b, and the third cloud computing environment 140c.

Figure 2:
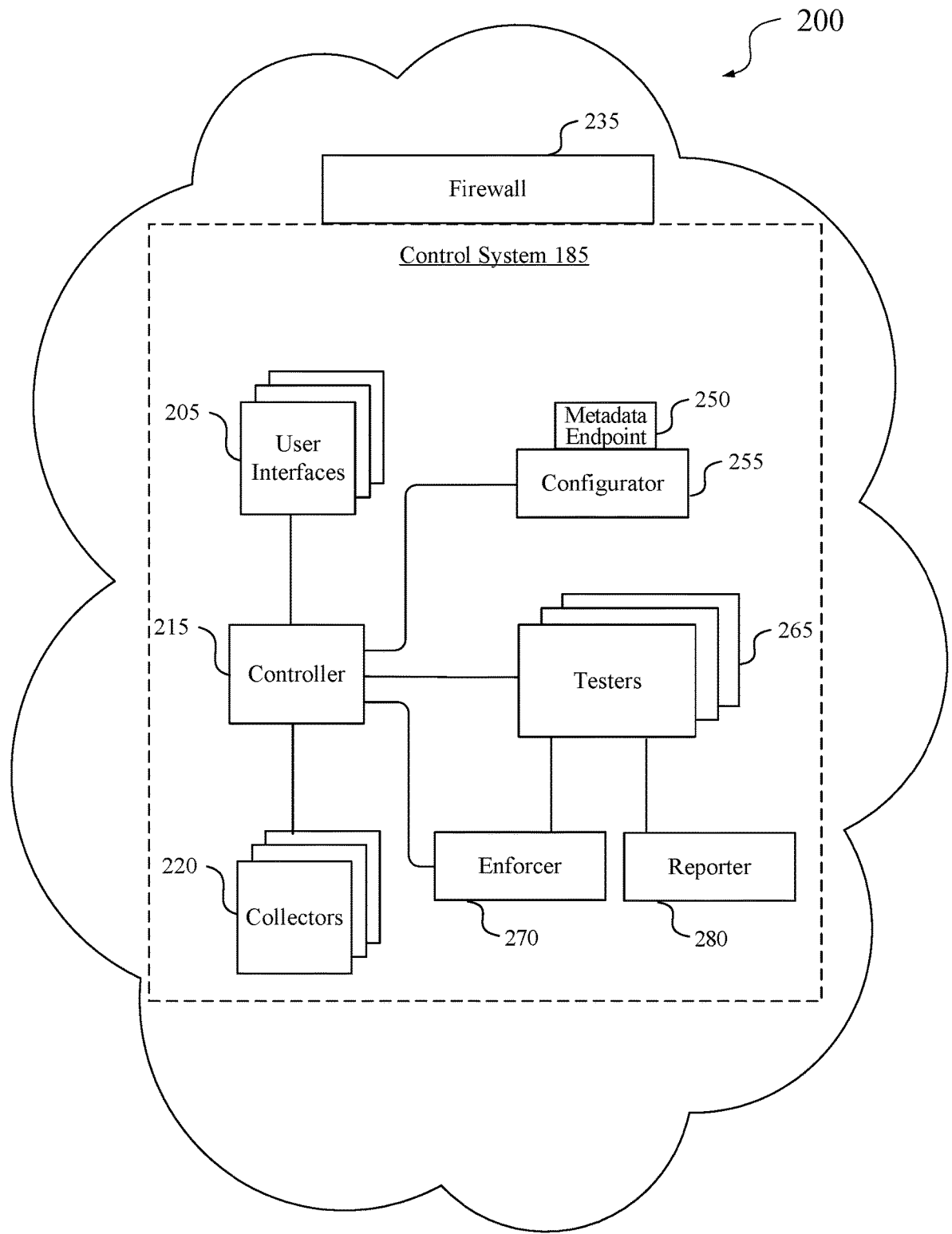
FIG. 2 depicts a block diagram of an embodiment of a cloud computing environment that includes a control system.

With reference to FIG. 2, a block diagram of an embodiment of a cloud computing environment 200 that includes the control system 185 is shown. The cloud computing environment 200 may be a private cloud. A firewall 235 may be provided for the control system 185. Some examples of the firewall 235 may include a proxy firewall, a stateful inspection firewall, a unified threat management (UTM) firewall, a next-generation firewall (NGFW), a threat-focused NGFW, and a virtual firewall.

The control system 185 may include a plurality of user interfaces 205. The user interfaces 205 may allow users to provide input to the control system 185. Some examples of the user interfaces 205 may include a keyboard, a mouse, a touchpad or touch screen on a display, a scroll wheel, a keypad, and an audio input device. For example, the user interfaces 205 may receive configuration settings to be applied to instances within the first cloud computing environment 140a, the second cloud computing environment 140b, and/or the third cloud computing environment 140c.

The control system 185 may also include a controller 215, a plurality of collectors 220, a configurator 255, a plurality of testers 265, an enforcer 270, and a reporter 280. The controller 215, the configurator 255, the testers 265, the enforcer 270, and the reporter 280 may be modules within a computing system or may be separate computing systems that are communicatively coupled. The computing systems may have various components such as processors, storage subsystems, and communications subsystems. Some examples of the computing systems may include personal computers, workstations, mainframes, server racks, and handheld portable devices.

The collectors 220 may retrieve information from the first cloud computing environment 140a, the second cloud computing environment 140b, and/or the third cloud computing environment 140c. The information retrieved by the collectors 220 may include functionalities of the first cloud computing environment 140a, the second cloud computing environment 140b, and/or the third cloud computing environment 140c, such as network configurations, a firewall rules, cloud application programming interfaces (APIs), resources, cloud service providers, and data sets. The information retrieved by the collectors 220 may also include data input types, data types, data sizes, or data ages of the first cloud computing environment 140a, the second cloud computing environment 140b, and/or the third cloud computing environment 140c.

The controller 215 may determine policies for the instances within the first cloud computing environment 140a, the second cloud computing environment 140b, and/or the third cloud computing environment 140c. For example, the policies may include firewall rules, forwarding rules, network configurations, cross-cloud routing rules, IP addressing rules, cross-cloud peering rules, security group management rules, storage bucket access rules, resource management rules, or subnet configurations. The controller 215 may determine general policies for all of the instances as functions of the configuration settings that are received from the user interfaces 205. Because the first cloud computing environment 140a, the second cloud computing environment 140b, and/or the third cloud computing environment 140c may use different languages, data sources, commands, and protocols, the controller 215 may also translate the general policies into specific policies for instances within each different cloud computing environment. For example, the controller 215 may determine specific policies according to the information retrieved from the first cloud computing environment 140a, the second cloud computing environment 140b, and/or the third cloud computing environment 140c.

The configurator 255 may receive the policies from the controller 215 and apply the policies to the instances. For each specific policy, the configurator 255 may retrieve a script from an API and execute the script in order to apply the specific policy to the instances within one of the cloud computing environments. The script may include instructions for the instances to implement the specific policy. Any number of specific policies may be applied to the instances within the cloud computing environment. In this example, the configurator 255 pushes the policies directly to the instances in order to update the configurations of the instances.

In another example, a metadata endpoint 250 may be provided for the configurator 255. The metadata endpoint 250 may receive the policies from the configurator 255 and host changes to the instances according to the policies. In this example, the instances retrieve the changes from the metadata service endpoint and apply the changes. The instances may subscribe to the metadata endpoint 250 and periodically check the metadata endpoint 250 for any updates. In this example, the instances pull the policies from the metadata endpoint 250 in order to update the configurations of the instances.

The testers 265 may inspect operations of the instances and detect violations of the policies by the instances. In some examples, a different tester 265 may be provided for each cloud computing environment. In other examples, a single tester 265 may be provided for a plurality of cloud computing environments. As described in further detail below, the testers 265 may detect violations of one or more specific policies by any of the instances.

The enforcer 270 may respond to the violations in a variety of ways. For example, the enforcer 270 may send a notification of the detected violation to the controller 215, which may direct the configurator 255 to apply the policy that was violated to the non-complying instance. In one example, if the policy requires the instances to have non-overlapping IP addresses and the testers 265 identify an overlap between the IP addresses, the enforcer 270 may direct the configurator 255 to request new IP addresses from at least one of the cloud computing environments. This procedure may be repeated until the number of overlapping IP addresses has been reduced or eliminated.

Alternatively or in addition, the reporter 280 may send a notification of the detected violation to at least one of the user interfaces 205. The notification may identify the instance that violated the policy, the cloud computing environment in which the instance is located, and the policy that was violated. The reporter 280 may send the notification via short message service (SMS), email, API call, or another notification method.

Figure 3:
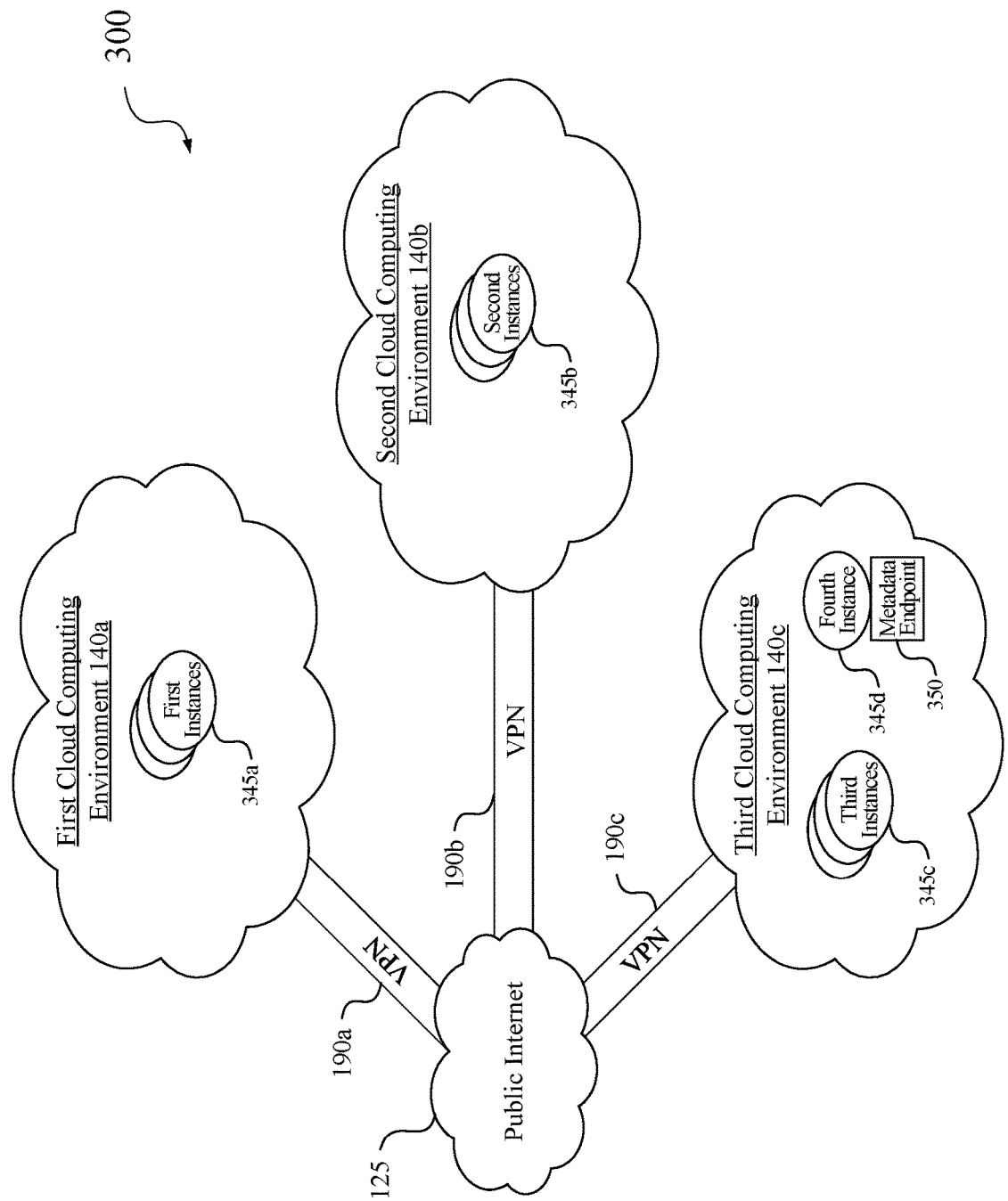
FIG. 3 depicts a block diagram of an embodiment of a portion of the network shown in FIG. 1.

Referring next to FIG. 3, a block diagram of an embodiment of a portion 300 of the network 100 is shown. The first cloud computing environment 140a may include a plurality of first instances 345a, the second cloud computing environment 140b may include a plurality of second instances 345b, and the third cloud computing environment 140c may include a plurality of third instances 345c. Some examples of the first instances 345a, the second instances 345b, and the third instances 345c may include virtual machines that emulate computer systems. The virtual machines may run various software packages. The first instances 345a, the second instances 345b, and the third instances 345c may be examples of the instances discussed above with respect to FIG. 2.

A metadata endpoint 350 may be provided for one, some, or all of the instances, such as a fourth instance 345d within the third cloud computing environment 140c. As discussed above, the metadata endpoint 350 may receive instructions from the configurator 255 and apply the policies to the fourth instance 345d.

Figure 4:
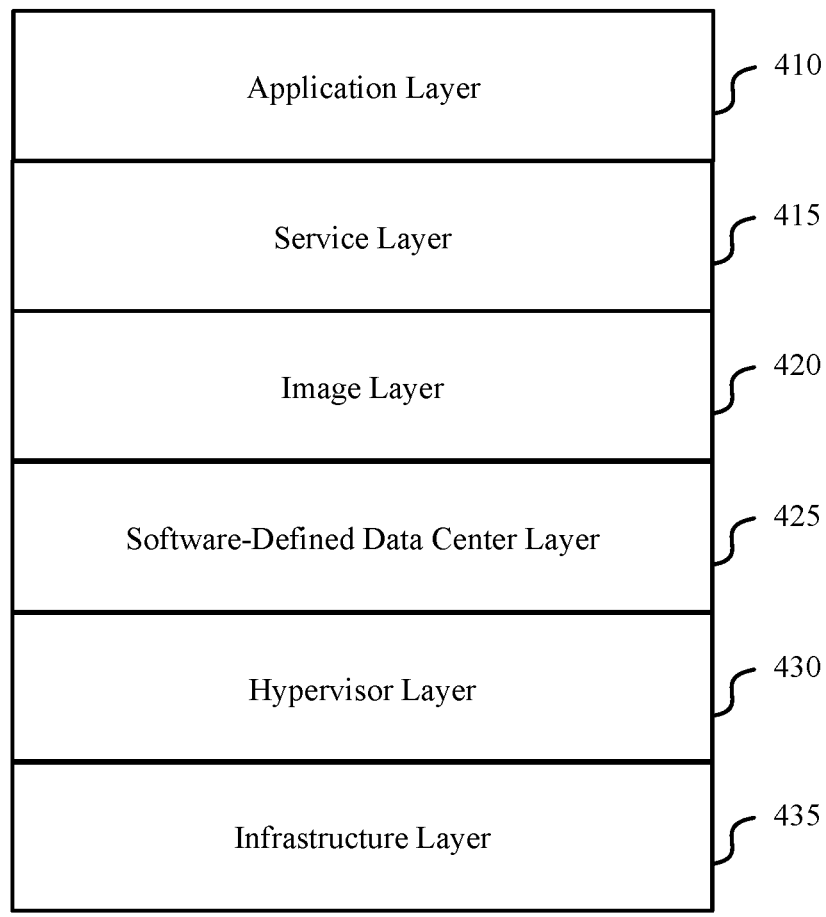
FIG. 4 depicts a block diagram of a cloud Open Systems Interconnection (OSI) model for cloud computing environments.

With reference to FIG. 4, a block diagram of a cloud Open Systems Interconnection (OSI) model 400 for cloud computing environments is shown. The cloud OSI model 400 for cloud computing environments partitions the flow of data in a communication system into six layers of abstraction. The cloud OSI model 400 for cloud computing environments may include, in order, an application layer 410, a service layer 415, an image layer 420, a software-defined data center layer 425, a hypervisor layer 430, and an infrastructure layer 435. Each layer serves a class of functionality to the layer above it and is served by the layer below it. Classes of functionality may be realized in software by various communication protocols.

The infrastructure layer 435 may include hardware, such as physical devices in a data center, that provides the foundation for the rest of the layers. The infrastructure layer 435 may transmit and receive unstructured raw data between a device and a physical transmission medium. For example, the infrastructure layer 435 may convert the digital bits into electrical, radio, or optical signals.

The hypervisor layer 430 may perform virtualization, which may allow the physical devices to be divided into virtual machines that can be bin packed onto physical machines for greater efficiency. The hypervisor layer 430 may provide virtualized compute, storage, and networking. For example, OpenStack® software that is installed on bare metal servers in a data center may provide virtualization cloud capabilities. The OpenStack® software may provide various infrastructure management capabilities to cloud operators and administrators, and may utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 425 may provide resource pooling, usage tracking, and governance on top of the hypervisor layer 430. The software-defined data center layer 425 may enable the creation virtualization for the Infrastructure-as-Code concept by using representational state transfer (REST) APIs. The management of block storage devices may be virtualized, and end users may be provided with a self-service API to request and consume those resources without requiring any knowledge of where the storage is actually deployed or on what type of device. Various compute nodes may be balanced for storage.

The image layer 420 may use various operating systems and other pre-installed software components. Patch management may be used to identify, acquire, install, and verify patches for products and systems. Patches may be used to correct security and functionality problems in software. Patches may also be used to add new features to operating systems, including security capabilities. The image layer 420 may focus on the compute instead of storage and networking. The instances within the cloud computing environments may be provided at the image layer 420.

The service layer 415 may provide middleware, such as functional components that applications use in tiers. In some examples, the middleware components may include databases, load balancers, web servers, message queues, email services, or other notification methods. The middleware components may be defined at the service layer 415 on top of particular images from the image layer 420. Different cloud computing environment providers may have different middleware components.

The application layer 420 may interact with software applications that implement a communicating component. The application layer 420 is the layer that is closest to the end user. Functions of the application layer 420 may include identifying communication partners, determining resource availability, and synchronizing communication. Applications within the application layer 420 may include custom code that makes use of middleware defined in the service layer 415.

Various features discussed above may be performed at one or more layers of the cloud OSI model 400 for cloud computing environments. For example, translating the general policies into specific policies for different cloud computing environments may be performed at the service layer 415 and the software-defined data center layer 425. Various scripts may be updated across the service layer 415, the image layer 420, and the software-defined data center layer 425. Further, APIs and policies may operate at the software-defined data center layer 425 and the hypervisor layer 430.

Each of the different cloud computing environments may have different service layers 415, image layers 420, software-defined data center layers 425, hypervisor layers 430, and infrastructure layers 435. Further, each of the different cloud computing environments may have an application layer 410 that can make calls to the specific policies in the service layer 415 and the software-defined data center layer 425. The application layer 410 may have substantially the same format and operation for each of the different cloud computing environments. Accordingly, developers for the application layer 410 may not need to understand the peculiarities of how each of the cloud computing environments operates in the other layers.

Figure 5:
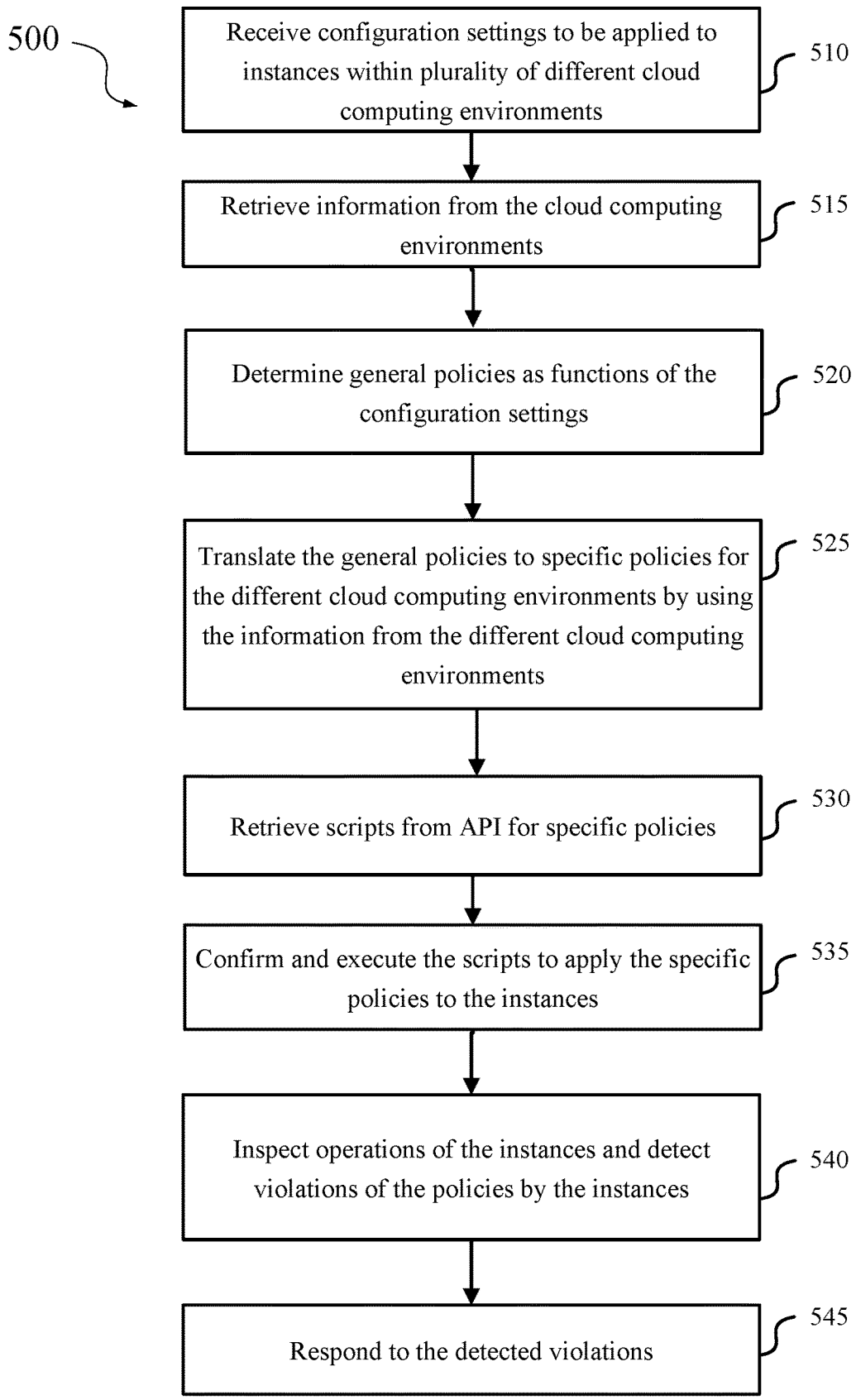
FIG. 5 depicts a flowchart of an embodiment of a method.

Referring next to FIG. 5, a flowchart of an embodiment of a method 500 is shown. The method 500 begins at block 510 where configuration settings to be applied to instances within a plurality of different cloud computing environments are received. For example, the configuration settings may be received via the user interfaces 205 and provided to the controller 215. The configuration settings may be intended for the first instances 345*a* within the first cloud computing environment 140*a* and the second instances 345*b* within the second cloud computing environment 140*b*. The first cloud computing environment 140*a* and the second cloud computing environment 140*b* may be run by different providers and may use different languages, data sources, commands, and protocols.

The method 500 continues at block 515 where information from the different cloud computing environments is retrieved. For example, information from the first cloud computing environment 140*a* and the second cloud computing environment 140*b* may be retrieved by the collectors 220. One of the collectors 220 may retrieve the information from the first cloud computing environment 140*a*, and another one of the collectors may retrieve the information from the second cloud computing environment 140*b*. Both the configuration settings and the information may be provided to the controller 215.

The method 500 continues at block 520 where general policies are determined as functions of the configuration settings. For example, the controller 215 may determine general policies that apply to the first instances 345*a* within the first cloud computing environment 140*a* and the second instances 345*b* within the second cloud computing environment 140*b*. The controller 215 may determine general policies that apply to all of the instances within some or all of the cloud computing environments within a network. This may ensure that the policies are consistent across the different cloud computing environments. For example, the policies may include firewall rules, forwarding rules, network configurations, cross-cloud routing rules, IP addressing rules, cross-cloud peering rules, security group management rules, storage bucket access rules, resource management rules, or subnet configurations.

The method 500 continues at block 525 where the general policies are translated to specific policies for instances within the different cloud computing environments. For example, the controller 215 may use the information about the first cloud computing environment 140*a* and the second cloud computing environment 140*b* to determine specific policies for instances within the first cloud computing environment 140*a* and the second cloud computing environment 140*b*, respectively. This translation may be performed at the service layer 415 and the software-defined data center layer 425 of the cloud OSI model 400 for cloud computing environments.

The method 500 continues at block 530 where scripts corresponding to the specific policies for the instances within the first cloud computing environment 140*a* and the second cloud computing environment 140*b* are retrieved. For example, the configurator 225 may receive the specific policies from the controller 215 and retrieve scripts corresponding to the specific policies from an API. The scripts may be written in JavaScript Object Notation (JSON)®. For each of the first cloud computing environment 140*a* and the second cloud computing environment 140*b*, a separate script may be retrieved for each of the specific policies. The following is an example of a script that may be used to establish a firewall rule for the first instances 345*a* within the first cloud computing environment 140*a*, where the first cloud computing environment 140*a* is run by Amazon Web Services (AWS)®:

```
C02XW1WCJGH6:~ username$ gcloud compute instances list --quiet --project example-project
--account username@netskope.com --format="json"
[
 {
  "canIpForward": false,
  "cpuPlatform": "Intel Broadwell",
  "creationTimestamp": "2020-05-07T21:42:51.931-07:00",
  "deletionProtection": false,
  "description": "",
  "disks": [
   {
    "autoDelete": true,
    "boot": true,
    "deviceName": "example-sample",
    "diskSizeGb": "500",
    "guestOsFeatures": [
     {
      "type": "VIRTIO_SCSI_MULTIQUEUE"
     }
    ],
    "index": 0,
    "interface": "SCSI",
```

```
username@inventory-puller01:~/tools/aws$ aws ec2 describe-instances --region us-west-2 --profile 111111111111
{
    "Reservations": [
        {
            "Groups": [],
            "Instances": [
                {
                    "AmiLaunchIndex": 0,
                    "ImageId": "ami-examplesample1234",
                    "InstanceId": "i-ami-00112233445566bbb",
                    "InstanceType": "t2.micro",
                    "KeyName": "samplesamplekeys",
                    "LaunchTime": "2020-10-13T00:42:34+00:00",
                    "Monitoring": {
                        "State": "disabled"
                    },
                    "Placement": {
                        "AvailabilityZone": "us-west-2a",
                        "GroupName": "",
                        "Tenancy": "default"
                    },
                    "PrivateDnsName": "ip-10-0-0-33.us-west-2.compute.internal",
                    "PrivateIpAddress": "10.0.0.33",
                    "ProductCodes": [],
                    "PublicDnsName": "ec2-54-1-2-2.us-west-2.compute.amazonaws.com",
                    "PublicIpAddress": "54.1.2.2",
                    "State": {
                        "Code": 16,
                        "Name": "running"
                    },
                    "StateTransitionReason": "",
                    "SubnetId": "subnet-00000000000111111",
                    "VpcId": "vpc-acdcabcdbeef12345",
                    "Architecture": "x86_64",
                    "BlockDeviceMappings": [
                        {
                            "DeviceName": "/dev/sda1",
                            "Ebs": {
                                "AttachTime": "2020-10-13T00:42:35+00:00",
                                "DeleteOnTermination": true,
                                "Status": "attached",
                                "VolumeId": "vol-00aabbccddeeffaaf"
                            }
                        }
                    ],
```

```
"ClientToken": "Netsk-EC2In-S0M72ATDKN7G",
"EbsOptimized": false,
"EnaSupport": true,
"Hypervisor": "xen",
"NetworkInterfaces": [
  {
    "Association": {
      "IpOwnerId": "amazon",
      "PublicDnsName": "ec2-54-1-2-2.us-west-2.compute.amazonaws.com",
      "PublicIp": "54.1.2.2"
    },
    "Attachment": {
      "AttachTime": "2020-10-13T00:42:34+00:00",
      "AttachmentId": "eni-attach-0d0d0d0d0d0d0d0da",
      "DeleteOnTermination": true,
      "DeviceIndex": 0,
      "Status": "attached"
    },
    "Description": "",
    "Groups": [
      {
        "GroupName": "ExampleGSE-XOPWG-444444444444",
        "GroupId": "sg-0d7d7d7d7d7d7d7d7"
      }
    ],
    "Ipv6Addresses": [],
    "MacAddress": "06:07:52:14:05:63",
    "NetworkInterfaceId": "eni-feedb00b888888888",
    "OwnerId": "111111111111",
    "PrivateDnsName": "ip-10-0-0-33.us-west-2.compute.internal",
    "PrivateIpAddress": "10.0.0.33",
    "PrivateIpAddresses": [
      {
        "Association": {
          "IpOwnerId": "amazon",
          "PublicDnsName": "ec2-54-1-2-2.us-west-2.compute.amazonaws.com",
          "PublicIp": "54.1.2.2"
        },
        "Primary": true,
        "PrivateDnsName": "ip-10-0-0-33.us-west-2.compute.internal",
        "PrivateIpAddress": "10.0.0.33"
      }
    ],
    "SourceDestCheck": true,
    "Status": "in-use",
    "SubnetId": "subnet-00000000000111111",
```

```
            "VpcId": "vpc-acdcabcdbeef12345",
            "InterfaceType": "interface"
        }
    ],
    "RootDeviceName": "/dev/sda1",
    "RootDeviceType": "ebs",
    "SecurityGroups": [
        {
            "GroupName": "ExampleGSE-XOPWG-444444444444",
            "GroupId": "sg-0d7d7d7d7d7d7d7d7"
        }
    ],
    "SourceDestCheck": true,
    "Tags": [
        {
            "Key": "aws:cloudformation:stack-name",
            "Value": "ExampleGSE"
        },
        {
            "Key": "aws:cloudformation:logical-id",
            "Value": "EC2Instance3"
        },
        {
            "Key": "Name",
            "Value": "vKEYEXAM-RTE"
        },
        {
            "Key": "Secure",
            "Value": "true"
        },
        {
            "Key": "aws:cloudformation:stack-id",
            "Value": "arn:aws:cloudformation:us-west-2:111111111111:stack/ExampleGSE/83838383-1234-5678-9012-34567890234c"
        }
    ],
    "VirtualizationType": "hvm",
    "CpuOptions": {
      "CoreCount": 1,
      "ThreadsPerCore": 1
    },
    "CapacityReservationSpecification": {
      "CapacityReservationPreference": "open"
    },
    "HibernationOptions": {
      "Configured": false
```

```
      },
      "MetadataOptions": {
        "State": "applied",
        "HttpTokens": "optional",
        "HttpPutResponseHopLimit": 1,
        "HttpEndpoint": "enabled"
      }
    }
  ],
  "OwnerId": "111111111111",
  "RequesterId": "999999999999",
  "ReservationId": "r-0a461bdf0f3847d2f"
},
{
  "Groups": [],
  "Instances": [
    {
      "AmiLaunchIndex": 0,
      "ImageId": "ami-01234567890123456",
      "InstanceId": "i-0a7e1422ba45daeb0",
      "InstanceType": "t2.micro",
      "KeyName": "samplesamplekeys",
      "LaunchTime": "2020-10-13T00:42:34+00:00",
      "Monitoring": {
        "State": "disabled"
      },
      "Placement": {
        "AvailabilityZone": "us-west-2a",
        "GroupName": "",
        "Tenancy": "default"
      },
      "PrivateDnsName": "ip-10-0-0-207.us-west-2.compute.internal",
      "PrivateIpAddress": "10.0.0.207",
      "ProductCodes": [],
      "PublicDnsName": "ec2-52-7-7-3.us-west-2.compute.amazonaws.com",
      "PublicIpAddress": "52.7.7.3",
      "State": {
        "Code": 16,
        "Name": "running"
      },
      "StateTransitionReason": "",
      "SubnetId": "subnet-00000000000111111",
      "VpcId": "vpc-acdcabcdbeef12345",
      "Architecture": "x86_64",
      "BlockDeviceMappings": [
        {
```

```
          "DeviceName": "/dev/xvda",
          "Ebs": {
            "AttachTime": "2020-10-13T00:42:35+00:00",
            "DeleteOnTermination": true,
            "Status": "attached",
            "VolumeId": "vol-05555555555555555"
          }
        }
      ],
      "ClientToken": "Netsk-EC2In-2NG249W8TK3Z",
      "EbsOptimized": false,
      "EnaSupport": true,
      "Hypervisor": "xen",
      "NetworkInterfaces": [
        {
          "Association": {
            "IpOwnerId": "amazon",
            "PublicDnsName": "ec2-52-7-7-3.us-west-2.compute.amazonaws.com",
            "PublicIp": "52.7.7.3"
          },
          "Attachment": {
            "AttachTime": "2020-10-13T00:42:34+00:00",
            "AttachmentId": "eni-attach-00000000000000000",
            "DeleteOnTermination": true,
            "DeviceIndex": 0,
            "Status": "attached"
          },
          "Description": "",
          "Groups": [
            {
              "GroupName": "ExampleGSE-IIIIII-1V2V3V4V5V6VC",
              "GroupId": " sg-00000000111111111"
            }
          ],
          "Ipv6Addresses": [],
          "MacAddress": "06:70:fa:6c:5e:3f",
          "NetworkInterfaceId": "eni-07777777777777777",
          "OwnerId": "111111111111",
          "PrivateDnsName": "ip-10-0-0-207.us-west-2.compute.internal",
          "PrivateIpAddress": "10.0.0.207",
          "PrivateIpAddresses": [
            {
              "Association": {
                "IpOwnerId": "amazon",
                "PublicDnsName": "ec2-52-7-7-3.us-west-2.compute.amazonaws.com",
                "PublicIp": "52.7.7.3"
```

```
        },
        "Primary": true,
        "PrivateDnsName": "ip-10-0-0-207.us-west-2.compute.internal",
        "PrivateIpAddress": "10.0.0.207"
      }
    ],
    "SourceDestCheck": true,
    "Status": "in-use",
    "SubnetId": "subnet-000000000000111111",
    "VpcId": "vpc-acdcabcdbeef12345",
    "InterfaceType": "interface"
  }
],
"RootDeviceName": "/dev/xvda",
"RootDeviceType": "ebs",
"SecurityGroups": [
  {
    "GroupName": "ExampleGSE-IIIIII-1V2V3V4V5V6VC",
    "GroupId": " sg-000000000111111111"
  }
],
"SourceDestCheck": true,
"Tags": [
  {
    "Key": "aws:cloudformation:logical-id",
    "Value": "EC2Instance1"
  },
  {
    "Key": "Name",
    "Value": "vGSE2020-Instance1"
  },
  {
    "Key": "Secure",
    "Value": "true"
  },
  {
    "Key": "aws:cloudformation:stack-name",
    "Value": "ExampleGSE"
  },
  {
    "Key": "aws:cloudformation:stack-id",
    "Value": "arn:aws:cloudformation:us-west-2:111111111111:stack/ExampleGSE/83838383-1234-5678-9012-34567890234c"
  }
],
"VirtualizationType": "hvm",
```

```
        "CpuOptions": {
          "CoreCount": 1,
          "ThreadsPerCore": 1
        },
        "CapacityReservationSpecification": {
          "CapacityReservationPreference": "open"
        },
        "HibernationOptions": {
          "Configured": false
        },
        "MetadataOptions": {
          "State": "applied",
          "HttpTokens": "optional",
          "HttpPutResponseHopLimit": 1,
          "HttpEndpoint": "enabled"
        }
      }
    ],
    "OwnerId": "111111111111",
    "RequesterId": "999999999999",
    "ReservationId": "r-0d0d0d88888888888"
  },
  {
    "Groups": [],
    "Instances": [
      {
        "AmiLaunchIndex": 0,
        "ImageId": "ami-01234567890123456",
        "InstanceId": "i-00ffffffffffeeeee",
        "InstanceType": "t2.micro",
        "KeyName": "samplesamplekeys",
        "LaunchTime": "2020-10-13T00:42:34+00:00",
        "Monitoring": {
          "State": "disabled"
        },
        "Placement": {
          "AvailabilityZone": "us-west-2a",
          "GroupName": "",
          "Tenancy": "default"
        },
        "PrivateDnsName": "ip-10-0-0-176.us-west-2.compute.internal",
        "PrivateIpAddress": "10.0.0.176",
        "ProductCodes": [],
        "PublicDnsName": "",
        "State": {
          "Code": 16,
```

```
      "Name": "running"
   },
   "StateTransitionReason": "",
   "SubnetId": "subnet-00000000000111111",
   "VpcId": "vpc-acdcabcdbeef12345",
   "Architecture": "x86_64",
   "BlockDeviceMappings": [
      {
         "DeviceName": "/dev/xvda",
         "Ebs": {
            "AttachTime": "2020-10-13T00:42:35+00:00",
            "DeleteOnTermination": true,
            "Status": "attached",
            "VolumeId": "vol-00c66163bbde36484"
         }
      }
   ],
   "ClientToken": "Netsk-EC2In-1TJCSHYW5MNGL",
   "EbsOptimized": false,
   "EnaSupport": true,
   "Hypervisor": "xen",
   "NetworkInterfaces": [
      {
         "Attachment": {
            "AttachTime": "2020-10-13T00:42:34+00:00",
            "AttachmentId": "eni-attach-015d6edd21f74691c",
            "DeleteOnTermination": true,
            "DeviceIndex": 0,
            "Status": "attached"
         },
         "Description": "",
         "Groups": [
            {
               "GroupName": "ExampleGSE-IIIIII-1V2V3V4V5V6VC",
               "GroupId": " sg-00000000111111111"
            }
         ],
         "Ipv6Addresses": [],
         "MacAddress": "66:66:66:55:55:55",
         "NetworkInterfaceId": "eni-676767676767676",
         "OwnerId": "111111111111",
         "PrivateDnsName": "ip-10-0-0-176.us-west-2.compute.internal",
         "PrivateIpAddress": "10.0.0.176",
         "PrivateIpAddresses": [
            {
               "Primary": true,
```

```
                "PrivateDnsName": "ip-10-0-0-176.us-west-2.compute.internal",
                "PrivateIpAddress": "10.0.0.176"
            }
        ],
        "SourceDestCheck": true,
        "Status": "in-use",
        "SubnetId": "subnet-00000000000111111",
        "VpcId": "vpc-acdcabcdbeef12345",
        "InterfaceType": "interface"
    }
],
"RootDeviceName": "/dev/xvda",
"RootDeviceType": "ebs",
"SecurityGroups": [
    {
        "GroupName": "ExampleGSE-IIIIII-1V2V3V4V5V6VC",
        "GroupId": " sg-00000000111111111"
    }
],
"SourceDestCheck": true,
"Tags": [
    {
        "Key": "aws:cloudformation:stack-id",
        "Value": "arn:aws:cloudformation:us-west-2:111111111111:stack/ExampleGSE/83838383-1234-5678-9012-34567890234c"
    },
    {
        "Key": "Secure",
        "Value": "false"
    },
    {
        "Key": "aws:cloudformation:logical-id",
        "Value": "EC2Instance2"
    },
    {
        "Key": "aws:cloudformation:stack-name",
        "Value": "ExampleGSE"
    }
],
"VirtualizationType": "hvm",
"CpuOptions": {
  "CoreCount": 1,
  "ThreadsPerCore": 1
},
"CapacityReservationSpecification": {
  "CapacityReservationPreference": "open"
```

Further, the following is an example of a script that may be used to establish the same firewall rule for the second instances 345*b* within the second cloud computing environment 140*b*, where the second cloud computing environment 140*b* is run by Google Cloud Platform (GCP)®:

```
C02XW1WCJGH6:~ username$ gcloud compute instances list --quiet --project example-project
--account username@netskope.com --format="json"
[
  {
    "canIpForward": false,
    "cpuPlatform": "Intel Broadwell",
    "creationTimestamp": "2020-05-07T21:42:51.931-07:00",
    "deletionProtection": false,
    "description": "",
    "disks": [
      {
        "autoDelete": true,
        "boot": true,
        "deviceName": "example-sample",
        "diskSizeGb": "500",
        "guestOsFeatures": [
          {
            "type": "VIRTIO_SCSI_MULTIQUEUE"
          }
        ],
        "index": 0,
        "interface": "SCSI",
        "kind": "compute#attachedDisk",
        "licenses": [
          "https://www.googleapis.com/compute/v1/projects/ubuntu-os-cloud/global/licenses/ubuntu-1604-xenial"
        ],
        "mode": "READ_WRITE",
        "source": "https://www.googleapis.com/compute/v1/projects/example-project/zones/us-west1-b/disks/example-sample",
        "type": "PERSISTENT"
      }
    ],
    "displayDevice": {
      "enableDisplay": false
    },
    "fingerprint": "4GTjmojZZPQ=",
    "id": "123456789098765432",
    "kind": "compute#instance",
    "labelFingerprint": "L_2Mh2A8RIA=",
    "labels": {
      "env": "test",
      "team": "data"
    },
    "lastStartTimestamp": "2020-05-07T21:42:56.861-07:00",
    "machineType": "https://www.googleapis.com/compute/v1/projects/example-project/zones/us-west1-b/machineTypes/custom-8-32768",
    "metadata": {
      "fingerprint": "MMMMMMMMMMM=",
      "kind": "compute#metadata"
    },
    "name": "example-sample",
    "networkInterfaces": [
      {
        "accessConfigs": [
          {
            "kind": "compute#accessConfig",
            "name": "External NAT",
            "natIP": "252.1.2.3",
            "networkTier": "PREMIUM",
            "type": "ONE_TO_ONE_NAT"
          }
        ],
        "fingerprint": "00_ffffff=",
        "kind": "compute#networkInterface",
        "name": "nic0",
        "network": "https://www.googleapis.com/compute/v1/projects/example-project/global/networks/sample-example",
        "networkIP": "10.240.128.18",
        "subnetwork": "https://www.googleapis.com/compute/v1/projects/example-project/regions/us-west1/subnetworks/sample-example-priv-vpn-subnet"
      }
    ],
    "reservationAffinity": {
```

```
        "consumeReservationType": "ANY_RESERVATION"
      },
      "scheduling": {
        "automaticRestart": true,
        "onHostMaintenance": "MIGRATE",
        "preemptible": false
      },
      "selfLink": "https://www.googleapis.com/compute/v1/projects/example-project/zones/us-west1-b/instances/example-sample",
      "serviceAccounts": [
        {
          "email": "1000000000000-compute@developer.gserviceaccount.com",
          "scopes": [
            "https://www.googleapis.com/auth/devstorage.read_only",
            "https://www.googleapis.com/auth/logging.write",
            "https://www.googleapis.com/auth/monitoring.write",
            "https://www.googleapis.com/auth/servicecontrol",
            "https://www.googleapis.com/auth/service.management.readonly",
            "https://www.googleapis.com/auth/trace.append"
          ]
        }
      ],
      "startRestricted": false,
      "status": "RUNNING",
      "tags": {
        "fingerprint": "1-888_XXXXX=",
        "items": [
          "https-server",
          "nspublic"
        ]
      },
      "zone": "https://www.googleapis.com/compute/v1/projects/example-project/zones/us-west1-b"
    },
    {
      "canIpForward": false,
      "cpuPlatform": "Intel Broadwell",
      "creationTimestamp": "2020-04-17T14:54:58.261-07:00",
      "deletionProtection": false,
      "description": "",
      "disks": [
        {
          "autoDelete": true,
          "boot": true,
          "deviceName": "test-vm",
          "diskSizeGb": "500",
          "guestOsFeatures": [
            {
              "type": "VIRTIO_SCSI_MULTIQUEUE"
            }
          ],
          "index": 0,
          "interface": "SCSI",
          "kind": "compute#attachedDisk",
          "licenses": [
            "https://www.googleapis.com/compute/v1/projects/ubuntu-os-cloud/global/licenses/ubuntu-1604-xenial"
          ],
          "mode": "READ_WRITE",
          "source": "https://www.googleapis.com/compute/v1/projects/example-project/zones/us-west1-b/disks/test-vm",
          "type": "PERSISTENT"
        }
      ],
      "displayDevice": {
        "enableDisplay": false
      },
      "fingerprint": "ZZZZZZZZZZZ=",
      "id": "5555555555555555555",
      "kind": "compute#instance",
      "labelFingerprint": "XBXBXBXBXBX=",
      "labels": {
        "env": "test",
        "team": "webui"
      },
      "lastStartTimestamp": "2020-04-29T10:59:48.190-07:00",
      "lastStopTimestamp": "2020-04-29T10:59:30.707-07:00",
      "machineType": "https://www.googleapis.com/compute/v1/projects/example-project/zones/us-west1-b/machineTypes/custom-8-44544",
      "metadata": {
```

```
    "fingerprint": "LMFFFFF-FFF=",
    "items": [
      {
        "key": "serial-port-enable",
        "value": "true"
      }
    ],
    "kind": "compute#metadata"
  },
  "name": "test-vm",
  "networkInterfaces": [
    {
      "accessConfigs": [
        {
          "kind": "compute#accessConfig",
          "name": "External NAT",
          "natIP": "35.1.1.15",
          "networkTier": "PREMIUM",
          "type": "ONE_TO_ONE_NAT"
        }
      ],
      "fingerprint": "BBBBBrIIIII=",
      "kind": "compute#networkInterface",
      "name": "nic0",
      "network": "https://www.googleapis.com/compute/v1/projects/example-project/global/networks/sample-example",
      "networkIP": " 10.240.131.209",
      "subnetwork": "https://www.googleapis.com/compute/v1/projects/example-project/regions/us-west1/subnetworks/sample-example-priv-vpn-subnet"
    }
  ],
  "reservationAffinity": {
    "consumeReservationType": "ANY_RESERVATION"
  },
  "scheduling": {
    "automaticRestart": true,
    "onHostMaintenance": "MIGRATE",
    "preemptible": false
  },
  "selfLink": "https://www.googleapis.com/compute/v1/projects/example-project/zones/us-west1-b/instances/test-vm",
  "serviceAccounts": [
    {
      "email": "1000000000000-compute@developer.gserviceaccount.com",
      "scopes": [
        "https://www.googleapis.com/auth/devstorage.read_only",
        "https://www.googleapis.com/auth/logging.write",
        "https://www.googleapis.com/auth/monitoring.write",
        "https://www.googleapis.com/auth/servicecontrol",
        "https://www.googleapis.com/auth/service.management.readonly",
        "https://www.googleapis.com/auth/trace.append"
      ]
    }
  ],
  "startRestricted": false,
  "status": "RUNNING",
  "tags": {
    "fingerprint": "1-888_XXXXX=",
    "items": [
      "https-server",
      "nspublic"
    ]
  },
  "zone": "https://www.googleapis.com/compute/v1/projects/example-project/zones/us-west1-b"
},
{
  "canIpForward": false,
  "cpuPlatform": "Intel Broadwell",
  "creationTimestamp": "2020-04-27T16:32:35.259-07:00",
  "deletionProtection": false,
  "description": "",
  "disks": [
    {
      "autoDelete": true,
      "boot": true,
      "deviceName": "example-vm-test",
      "diskSizeGb": "500",
      "guestOsFeatures": [
        {
```

-continued

```
        "type": "VIRTIO_SCSI_MULTIQUEUE"
      }
    ],
    "index": 0,
    "interface": "SCSI",
    "kind": "compute#attachedDisk",
    "licenses": [
      "https://www.googleapis.com/compute/v1/projects/ubuntu-os-
cloud/global/licenses/ubuntu-1604-xenial"
    ],
    "mode": "READ_WRITE",
    "source": "https://www.googleapis.com/compute/v1/projects/example-project/zones/us-
west1-b/disks/example-vm-test",
    "type": "PERSISTENT"
  }
],
"displayDevice": {
  "enableDisplay": false
},
"fingerprint": "11111111111=",
"id": "8978978978978978978",
"kind": "compute#instance",
"labelFingerprint": "42424242424=",
"lastStartTimestamp": "2020-04-27T16:32:41.002-07:00",
"machineType": "https://www.googleapis.com/compute/v1/projects/example-project/zones/us-
west1-b/machineTypes/n1-standard-8",
"metadata": {
  "fingerprint": "MMMMMMMMMMM=",
  "kind": "compute#metadata"
},
"name": "example-vm-test",
"networkInterfaces": [
  {
    "accessConfigs": [
```

The method 500 continues at block 535 where the scripts corresponding to the specific policies for the instances within the first cloud computing environment 140*a* and the second cloud computing environment 140*b* are confirmed and executed. For example, the configurator 225 may confirm that the first script quoted above will instruct the first instances 345*a* within the first cloud computing environment 140*a* to establish the desired firewall rule. The configurator 225 may then execute the first script in order to apply the firewall rule to the first instances 345*a* within the first cloud computing environment 140*a*. The firewall rule may be applied to the first instances 345*a* within the first cloud computing environment 140*a* simultaneously or in sequence. The configurator 225 may then confirm that the second script quoted above will instruct the second instances 345*b* within the second cloud computing environment 140*b* to establish the desired firewall rule. The configurator 225 may then execute the second script in order to apply the firewall rule to the second instances 345*b* within the second cloud computing environment 140*b*. Again, the firewall rule may be applied to the second instances 345*b* within the second cloud computing environment 140*b* simultaneously or in sequence. This procedure may be repeated until the firewall rule has been applied to all of the instances in the network.

The method 500 continues at block 540 where operations of the instances within the cloud computing environments are inspected. For example, the testers 265 may inspect operations of the first instances 345*a* within the first cloud computing environment 140*a* and the second instances 345*b* within the second cloud computing environment 140*b*. One or more of the testers 265 may be provided for each of the cloud computing environments, or a single tester 265 may be provided for all of the cloud computing environments.

As one example of the testing procedure that may be performed at block 540, the first tester 265 may determine whether the first instance 345*a* was correctly set up as a load balancer. For example, the first tester 265 may inspect the first instance 345*a* to determine whether it complies with various policies, such as whether the load balancer was set up, whether the load balancer is running correctly, whether the load balancer has enough processing power, and whether the load balancer has the correct IP address. More specific details of embodiments of the testing procedure are provided below.

Figure 6:
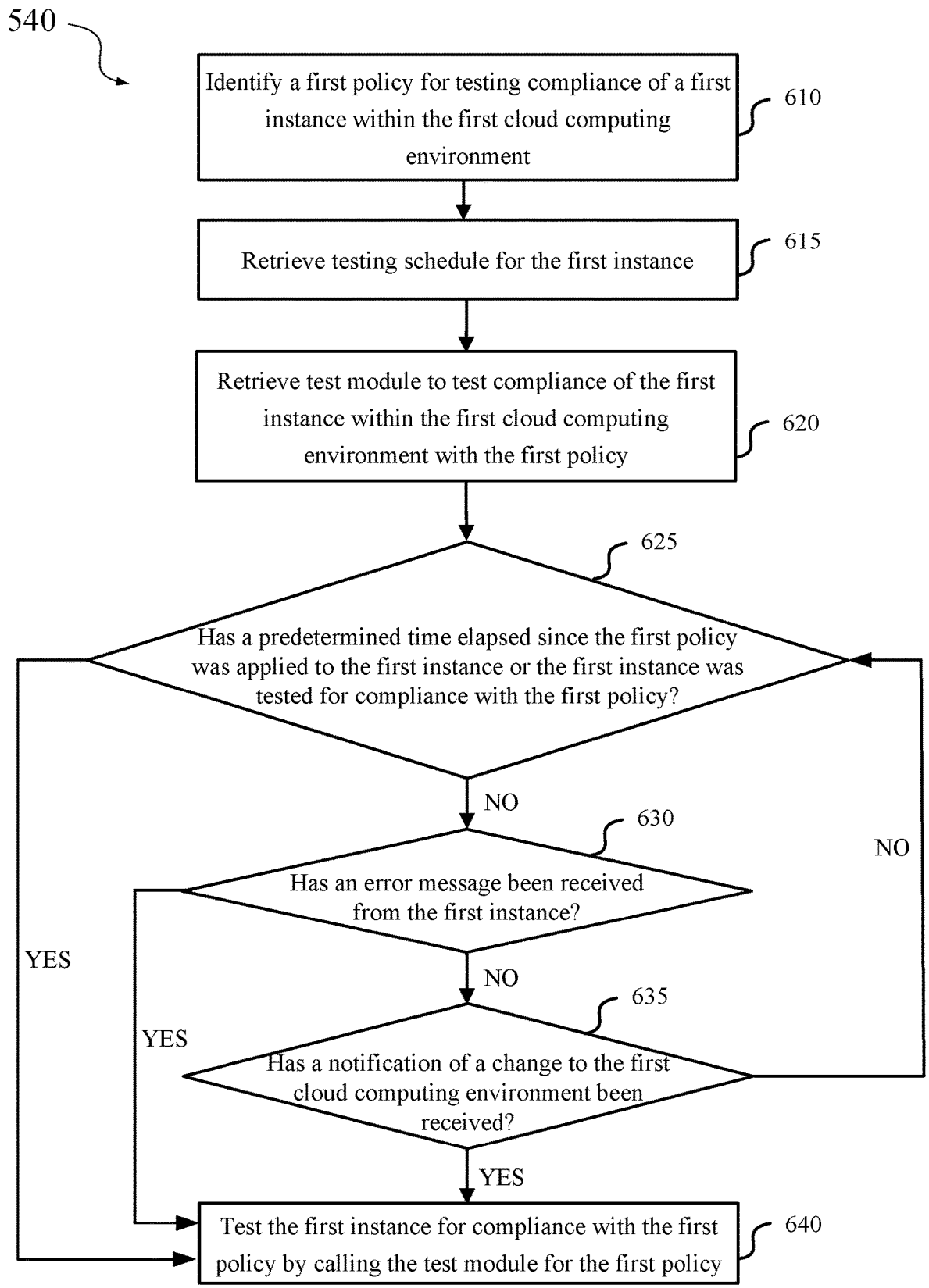
FIG. 6 depicts a flowchart of an embodiment of a portion of the method shown in FIG. 5.

Referring next to FIG. 6, a flowchart of an embodiment of block 540 of the method 500 described in FIG. 5 is shown. The example shown in FIG. 6 describes a method for testing a first instance for compliance with a first policy. However, this example may be expanded to test the first instance for compliance with a plurality of policies. This example may also be expanded to test additional instances for compliance with the first policy and/or the plurality of policies. Any such testing may be performed in parallel and/or in sequence.

The method 540 begins at block 610 where a first policy is identified for testing compliance of the first instance 345*a* within the first cloud computing environment 140*a*. For example, a first tester 265 may identify the first policy by referencing a table that stores a list of each specific policy that has been applied to each instance within the network 100. The table may be stored within a data storage component within the control system 185. The first policy may be identified by a variety of methods, such as a random selection from the specific policies that have been applied to the first instance 345*a*, or a selection of the specific policy that was applied to the first instance 345*a* at the earliest time.

The method 540 continues at block 615 where a testing schedule is retrieved for the first instance 345*a*. For example, the testing schedule may indicate a frequency of testing for the first instance 345a for compliance with each of the specific policies. The frequency of testing may be constant or may change as a function of time. The testing schedule may also indicate a predetermined time at which to start testing the first instance 345a after each of the specific policies was applied to the first instance 345a. The testing schedule may be the same for one or more of the specific policies, or may be different for one or more of the specific policies. The first tester 265 may retrieve the testing schedule from the data storage component within the control system 185.

The method 540 continues at block 620 where a test module to test the compliance of the first instance 345a within the first cloud computing environment 140a with the first policy is retrieved. A separate test module may be stored within the data storage component for each of the specific policies. Each test module may be written for a specific cloud computing environment, and may be written as a JavaScript Object Notation (JSON)® script. For example, the first tester 265 may retrieve a first test module to test the compliance of the first instance 345a within the first cloud computing environment 140a for compliance with the first policy.

The method 540 continues at block 625 where it is determined whether a predetermined time has elapsed since the first policy was applied to the first instance 345a or the first instance 345a was last tested for compliance with the first policy. For example, the first tester 265 may refer to the testing schedule for the first instance 345a, along with a table that stores a list of the times at which the first instance 345a was tested for compliance with the specific policies. If the first instance 345a has already been tested for compliance with the first policy, the first tester 265 may determine whether a predetermined time has elapsed since the first instance 345a was last tested for compliance with the first policy. If the predetermined time has not elapsed, the method 540 may proceed to block 630. If the predetermined time has elapsed, the method may proceed to block 640. Similarly, if the first instance 345a has not yet been tested for compliance with the first policy, the first tester 265 may determine whether another predetermined time has elapsed since the first policy was applied to the first instance 345a. If the other predetermined time has not elapsed, the method 540 may proceed to block 630. If the other predetermined time has elapsed, the method may proceed to block 640.

At block 630 it is determined whether an error message has been received from the first instance 345a. For example, after the first policy is applied to the first instance 345a, the first instance 345a may send an error message to the control system 185 indicating that the first instance 345a was unable to implement the first policy or maintain compliance with the first policy.

At block 635 it is determined whether a notification of a change to the first cloud computing environment 140a has been received. For example, after the first policy is applied to the first instance 345a, the first cloud computing environment 140a may send a message to the control system 185 indicating a change in its operation or configuration that may affect the compliance of the first instance 345a with the first policy. If no notifications have been received from the first cloud computing environment 140a, the method 540 may return to block 625. If a notification has been received from the first cloud computing environment 140a, the method 540 may proceed to block 640.

At block 640 the first instance 345a is tested for compliance with the first policy by calling the test module corresponding to the first policy. For example, the first tester 265 may call the test module that was retrieved at block 610 to test the first instance 345a for compliance with the first policy. The testing may determine that the first instance 345a is complying with the first policy or violating the first policy.

Returning to FIG. 5, the method 500 continues at block 545 where the control system 185 responds to any detected violations. For example, the enforcer 270 may receive a notification from the first tester 265 that the first instance 345a violated the first policy. The enforcer 270 may then send a notification of the violation to the controller 215, which may receive the notification and require the first instance 345a to comply with the first policy. For example, the controller 215 may instruct the configurator 255 to apply the first policy to the first instance 345a again. Alternatively, the controller 215 may shut down the first instance 345a or cut off communications with the first instance 345a. Alternatively or in addition, the reporter 280 may send a notification of the violation to at least one of the user interfaces 205. For example, the reporter 280 may send the notification of the violation to the user interface 205 that provided the configuration settings for the first instance 345a.

As another example of the testing and response procedures discussed with respect to FIG. 5, the first tester 265 may inspect the IP addresses that have been assigned to the plurality of first instances 345a within the first cloud computing environment 140a at block 540. The first tester 265 may then determine whether there is a violation of a policy to have non-overlapping IP addresses for the plurality of first instances 345a at block 540. If such a violation exists, the first tester 265 may send a notification to the enforcer 270. The enforcer 270 may then send a notification of the violation to the controller 215, which may receive the notification and request the allocation of new IP addresses from the first cloud computing environment 140a at block 545. This testing and response procedure may be repeated until the first instances 345a have non-overlapping IP addresses, or until the number of overlapping IP addresses has been reduced below a threshold. For example, the threshold may be a percentage of the number of the first instances 345a within the first cloud computing environment 140a. Alternatively, the controller 215 may shut down any instances having overlapping IP addresses or cut off communications with any instances having overlapping IP addresses. Alternatively or in addition, the reporter 280 may send a notification of the overlapping IP addresses, including a list of the affected instances, to at least one of the user interfaces 205.

Further, this testing and response procedure may be conducted to inspect the IP addresses that have been assigned to all of the instances within the network 100. For example, one or more of the testers 265 may inspect the IP addresses that have been assigned to the plurality of first instances 345a within the first cloud computing environment 140a, the plurality of second instances 345b within the first cloud computing environment 140b, and the plurality of third instances 345c within the third cloud computing environment 140c. The remainder of the testing and response procedure may be the same as discussed above.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for providing policy-controlled communication over the Internet between a plurality of different cloud computing environments, detecting violations of policies and responding to the violations, the system comprising:
   a user interface that receives configuration settings to be applied to a plurality of first instances within a first cloud computing environment and a plurality of second instances within a second cloud computing environment, wherein:
     the first cloud computing environment comprises one or more first processors and one or more first memories, and
     the second cloud computing environment comprises one or more second processors and one or more memories;
   a plurality of collectors that retrieve information from the first cloud computing environment and the second cloud computing environment, wherein the information comprises a plurality of functionalities of the first cloud computing environment and the second cloud computing environment;
   a controller that determines policies for the plurality of first instances within the first cloud computing environment and the plurality of second instances within the second cloud computing environment as functions of the configuration settings and the information;
   a configurator that applies the policies to the plurality of first instances within the first cloud computing environment and the plurality of second instances within the second cloud computing environment;
   a first tester that inspects operations of the plurality of first instances within the first cloud computing environment and detects violations of the policies by the plurality of first instances within the first cloud computing environment, wherein the first tester inspects the operations based on a testing schedule which indicates a frequency of testing for the first instance for compliance after each specific policies was applied to the first instance and a table that stores a list of a number of times at which the first instance was tested for the compliance with the specific policies; and
   an enforcer that responds to the detected violations by receiving a notification from the first tester that a first instance from the plurality of first instances violated a first policy, wherein the controller instructs the configurator to apply the first policy to the first instance again, shut down the first instance or cut off communications with the first instance.

2. The system of claim 1, wherein the plurality of functionalities of the first cloud computing environment and the second cloud computing environment comprises at least one of network configurations, firewall rules, cloud application programming interfaces (APIs), resources, cloud service providers, or data sets.

3. The system of claim 1, wherein the information further comprises at least one of a data input type, a data type, a data size, or a data age, and the plurality of collectors are further configured to normalize the information to have a common format.

4. The system of claim 1, wherein the policies comprise at least one of firewall rules, forwarding rules, network configurations, cross-cloud routing rules, IP addressing rules, cross-cloud peering rules, security group management rules, storage bucket access rules, resource management rules, or subnet configurations.

5. A method for providing policy-controlled communication over the Internet between a plurality of different cloud computing environments, detecting violations of policies and responding to the violations, the method comprising:
  receiving configuration settings to be applied to a plurality of first instances within a first cloud computing environment and a plurality of second instances within a second cloud computing environment;
  retrieving information from the first cloud computing environment and the second cloud computing environment, wherein the information comprises a plurality of functionalities of the first cloud computing environment and the second cloud computing environment;
  determining policies for the plurality of first instances within the first cloud computing environment and the plurality of second instances within the second cloud computing environment as functions of the configuration settings and the information;
  applying the policies to the plurality of first instances within the first cloud computing environment and the plurality of second instances within the second cloud computing environment;
  inspecting operations of the plurality of first instances within the first cloud computing environment and the plurality of second instances within the second cloud computing environment and detecting violations of the policies by the plurality of first instances within the first cloud computing environment and the plurality of second instances within the second cloud computing environment; and
  responding to the detected violations by receiving a notification that a first instance from the plurality of first instances violated a first policy, wherein a controller instructs a configurator to apply the first policy to the first instance again, shut down the first instance or cut off communications with the first instance.

6. The method of claim 5, wherein determining the policies comprises determining general policies as functions of the configuration settings and translating the general policies to specific policies for the first cloud computing environment and the second cloud computing environment by using the information.

7. The method of claim 6, wherein applying the policies comprises retrieving scripts corresponding to the specific policies and applying the specific policies to the plurality of first instances within the first cloud computing environment and the plurality of second instances within the second cloud computing environment by executing the scripts.

8. The method of claim 5, further comprising sending the notification of a detected violation of a policy by an instance of the plurality of first instances within the first cloud computing environment to a user interface.

9. The method of claim 5, wherein a first tester may inspect the first instance to determine whether it complies with various policies, such as whether a load balancer was set up, whether the load balancer is running correctly, whether the load balancer has enough processing power, and whether the load balancer has a correct IP address.

10. A system for providing policy-controlled communication over the Internet between a plurality of different cloud computing environments, detecting violations of policies and responding to the violations, the system comprising one or more processors and one or more memories with code for:
  a user interface that is configured to receive configuration settings to be applied to a plurality of first instances within a first cloud computing environment and a plurality of second instances within a second cloud computing environment, wherein:
    the first cloud computing environment comprises one or more first processors and one or more first memories, and
    the second cloud computing environment comprises one or more second processors and one or more memories;
  a plurality of collectors that are configured to retrieve information from the first cloud computing environment and the second cloud computing environment, wherein the information comprises a plurality of functionalities of the first cloud computing environment and the second cloud computing environment;
  a controller that is configured to determine policies for the plurality of first instances within the first cloud computing environment and the plurality of second instances within the second cloud computing environment as functions of the configuration settings and the information;
  a configurator that is configured to apply the policies to the plurality of first instances within the first cloud computing environment and the plurality of second instances within the second cloud computing environment;
  a first tester that is configured to inspect operations of the plurality of first instances within the first cloud computing environment, wherein the first tester inspects the operations based on a testing schedule which indicates a frequency of testing for the first instance for compliance after each specific policies was applied to the first instance and a table that stores a list of a number of times at which the first instance was tested for the compliance with the specific policies, and a second tester that inspect operations of the plurality of second instances within the second cloud computing environment to detect violations of the policies by the plurality of first instances within the first cloud computing environment and violations of the policies by the plurality of second instances within the second cloud computing environment, respectively; and
  an enforcer that is configured to respond to the detected violations by receiving a notification from the first tester that a first instance from the plurality of first instances violated a first policy, wherein the controller instructs the configurator to apply the first policy to the first instance again, shut down the first instance or cut off communications with the first instance.

11. The system of claim 10, wherein the controller is configured to determine the policies by determining general policies as functions of the configuration settings and translating the general policies to specific policies for the first cloud computing environment and the second cloud computing environment by using the information.

12. The system of claim 11, wherein the controller is configured to translate the general policies to the specific policies at a service layer and a software-defined data center layer.

13. The system of claim 11, wherein the configurator is configured to retrieve scripts corresponding to the specific policies and to apply the specific policies to the plurality of first instances within the first cloud computing environment and the plurality of second instances within the second cloud computing environment by executing the scripts.

14. The system of claim 10, further comprising a reporter is configured to send the notification via a short message service (SMS), an email, an Application Programming Interface (API) call, or another notification method.

15. The system of claim 10, further comprising a metadata service endpoint that is configured to receive the policies from the configurator and to host changes to the plurality of first instances and the plurality of second instances, wherein the plurality of first instances within the first cloud computing environment and the plurality of second instances within the second cloud computing environment are configured to retrieve the changes from the metadata service endpoint and to apply the changes.

16. The system of claim 10, wherein the enforcer is further configured to send the notification of the detected violation to the controller, which directs the configurator to apply the first policy that was violated to a non-complying instance.

17. The system of claim 10, wherein the notification identifies the first instance that violated the first policy, the first cloud computing environment in which the first instance is located, and the first policy that was violated.

18. The system of claim 17, wherein the controller is further configured to receive the notification of the detected violation and to require the first instance of the plurality of first instances within the first cloud computing environment to comply with the first policy that was violated.

19. The system of claim 10, wherein the first tester is further configured to inspect existing IP addresses of the plurality of first instances and to send a notification to the enforcer to request new IP addresses from the first cloud computing environment upon identifying an overlap between the existing IP addresses.

20. The system of claim 10, wherein the first tester is further configured to inspect the operations of the plurality of first instances based on a testing schedule which indicates a frequency of testing for the plurality of first instances for compliance with the policies.

* * * * *